United States Patent Office.

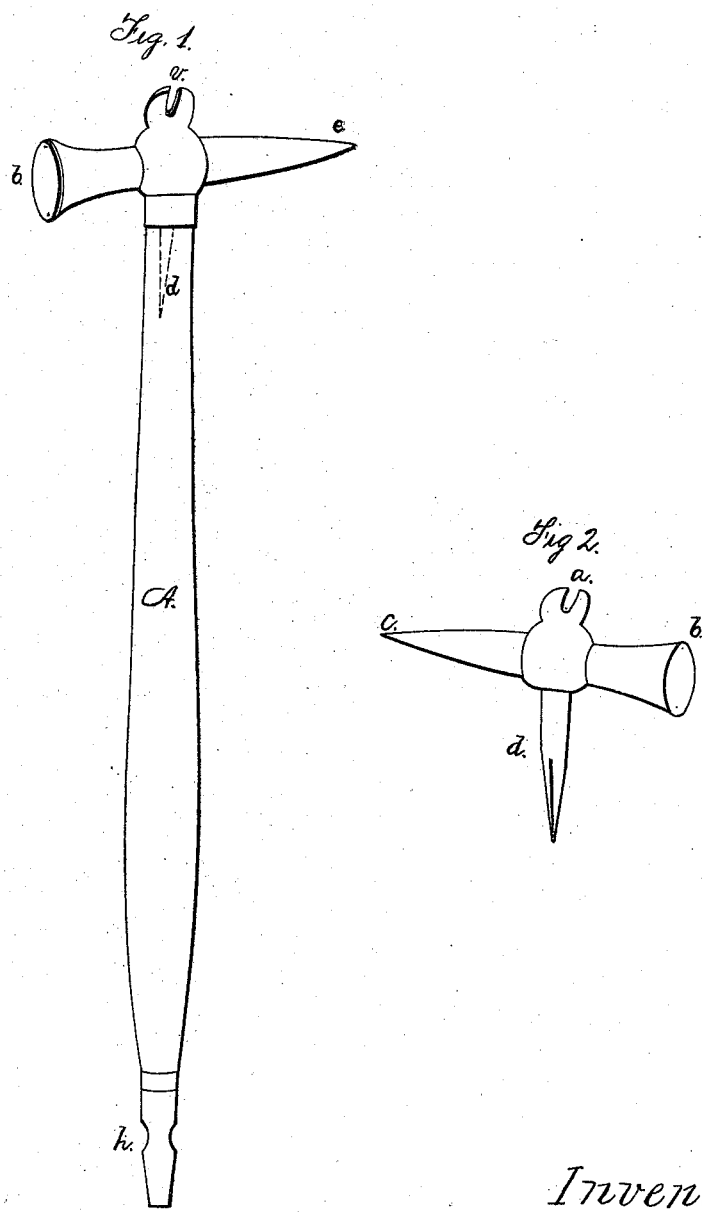

SAMUEL B. SMITH, OF NEW HAVEN, CONNECTICUT.

Letters Patent No. 97,715, dated December 7, 1869.

IMPROVEMENT IN HAMMER.

The Schedule referred to in these Letters Patent and making part of the same.

*To all whom it may concern:*

Be it known that I, SAMUEL B. SMITH, of the city and county of New Haven, in the State of Connecticut, have invented a new and useful Improvement in Carpet, &c., Tool, as a new article of manufacture; and I do hereby declare that the following is a full, clear, and exact description of the construction, character, and operation of the same, reference being had to the accompanying drawings, which make part of this specification, in which—

Figure 1 is a perspective view of the whole apparatus, showing the claw, hammer, ice-pick, screw-driver, and their common handle and connection;

Figure 2 is a perspective view of the claw, hammer, and ice-pick, and the shank of the hammer, &c.

My improvement consists in making the tool or article so as to contain or embody a claw, a hammer, an ice-pick, and a screw-driver, all attached to the same handle, forming one compound tool.

I make the claw $a$, hammer $b$, and ice-pick $c$, all of one piece, of malleable cast-iron, or any other suitable metal, with a suitable shank, as $d$, to firmly connect it with the handle A. And in the other end of the handle A, I fit a screw-driver, as represented at $h$, fig. 1, which may also serve as a point or edge, to start the tacks from the carpet when taking it up. And the ice-pick or point $c$ may also be used as a punch, to punch holes in pieces of zinc or other substance with which it may be desirable to cover certain portions of the floor. And the claw $a$, with the handle A, may be used as a lifter for stove-covers, &c.

The principal advantages of my improvement or new article of manufacture consist in that it embodies more articles or implements, (all of a useful character,) at much less expense, while the article is much less liable to get out of repair, and much more easily repaired when a casualty happens.

What I claim as my invention, and desire to secure by Letters Patent, is—

The implement composed of the claw $a$, hammer $b$, ice-pick $c$, screw-driver $h$, and handle A, when the whole is constructed and arranged as herein described.

SAMUEL B. SMITH.

Witnesses:
RICHARD F. LYON,
R. FITZGERALD.